US012352075B2

(12) United States Patent
Gokcebay et al.

(10) Patent No.: US 12,352,075 B2
(45) Date of Patent: *Jul. 8, 2025

(54) ELECTRONICALLY OPERATED LOCK CYLINDER

(71) Applicant: Security People, Inc., Houston, TX (US)

(72) Inventors: Asil Gokcebay, Petaluma, CA (US); An Zhang, Shaoguan (CN)

(73) Assignee: Security People, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,209

(22) Filed: May 22, 2023

(65) Prior Publication Data

US 2023/0332433 A1 Oct. 19, 2023

Related U.S. Application Data

(63) Continuation of application No. 17/722,045, filed on Apr. 15, 2022, now Pat. No. 11,655,653.

(51) Int. Cl.
*E05B 47/00* (2006.01)
*E05B 9/08* (2006.01)
(Continued)

(52) U.S. Cl.
CPC ............ *E05B 47/0012* (2013.01); *E05B 9/08* (2013.01); *E05B 9/105* (2013.01); *E05B 17/044* (2013.01);
(Continued)

(58) Field of Classification Search
CPC ... E05B 9/08; E05B 9/10; E05B 9/105; E05B 17/04; E05B 17/044; E05B 17/047;
(Continued)

(56) References Cited

U.S. PATENT DOCUMENTS 7,275,402 B2 * 10/2007 Luling ................ E05B 47/0692 70/279.1
7,874,190 B2 * 1/2011 Krisch ................ E05B 47/0649 70/277

(Continued)

*Primary Examiner* — Christopher J Boswell

(57) ABSTRACT

An electronic lock cylinder that may be a direct replacement for a European-style standard cylinder is disclosed. The lock cylinder may include a core, a first shaft rotatably mounted in the core, and a second shaft rotatably mounted in the core and coaxial with the first shaft. A first cam and a second cam may be each rotatably mounted in the core and coaxial with the first shaft. The first cam may include a first lug and the second cam may include a second lug, where the first lug and the second lug may each be coupled to a deadbolt. A clutch may be disposed on the first shaft and shiftable from a first position to a second position, and a motor may be disposed in the core and operatively coupled to the clutch and configured to shift the clutch from the first position to the second position. When the clutch is in the first position, the first shaft is operatively coupled to the first cam, and the second shaft is decoupled from both the first cam and the second cam, when the clutch is in the second position, both the first shaft and the second shaft are operatively coupled to the second cam.

13 Claims, 17 Drawing Sheets

(51) Int. Cl.
*E05B 9/10* (2006.01)
*E05B 17/04* (2006.01)

(52) U.S. Cl.
CPC .... *E05B 17/047* (2013.01); *E05B 2047/0024* (2013.01); *E05B 2047/0026* (2013.01); *E05B 2047/0058* (2013.01)

(58) Field of Classification Search
CPC ................. E05B 47/0012; E05B 63/08; E05B 2047/0017; E05B 2047/002; E05B 2047/0024; E05B 2047/0026; E05B 2047/0028; E05B 2047/0058; E05B 2047/0091
See application file for complete search history.

(56) References Cited

U.S. PATENT DOCUMENTS

| | | | | |
|---|---|---|---|---|
| 7,966,854 | B2 * | 6/2011 | Imedio Ocana | E05B 47/0642 192/69.62 |
| 8,516,865 | B2 * | 8/2013 | Ferreira Sanchez | E05B 47/0642 70/472 |
| 10,145,147 | B2 * | 12/2018 | Ferreira | E05B 47/0649 |
| 11,655,653 | B1 * | 5/2023 | Zhang | E05B 47/0642 70/277 |
| 11,982,104 | B2 * | 5/2024 | Trespidi | E05B 47/0642 |
| 2016/0094103 | A1 * | 3/2016 | Lien | E05B 47/0642 292/336.3 |
| 2016/0145900 | A1 * | 5/2016 | Kaiser | E05B 47/0642 70/283.1 |
| 2019/0078352 | A1 * | 3/2019 | Nicoara | E05B 17/047 |

* cited by examiner

ELECTRONICALLY OPERATED LOCK CYLINDER

CROSS REFERENCE TO RELATED APPLICATIONS

This application is a continuation of, and claims priority to, U.S. application Ser. No. 17/722,045, filed on Apr. 15, 2022.

FIELD OF THE DISCLOSURE

The present disclosure relates generally to a European style electronically operated lock cylinder for a door lock.

BACKGROUND OF THE INVENTION

Mechanical lock cylinders in the European style are well known. A user pushes a key into the slot, which aligns the pins in the cylinder. The user turns the key, thereby turning a cam within the lock, which can translate a latch or a bolt in and out of the lock casing.

In recent years, attempts have been made to replace the mechanical lock cylinder with an electronically actuated lock. These include US2010/011822, US7591160, U.S. Pat. Nos. 8,459,071, 8,689,594, EP2665045, EP3271532, and EP1079051. But despite these efforts, a need remains for an effective, efficient, and dependable electronic lock cylinder.

DETAILED DESCRIPTION

Figure 1:
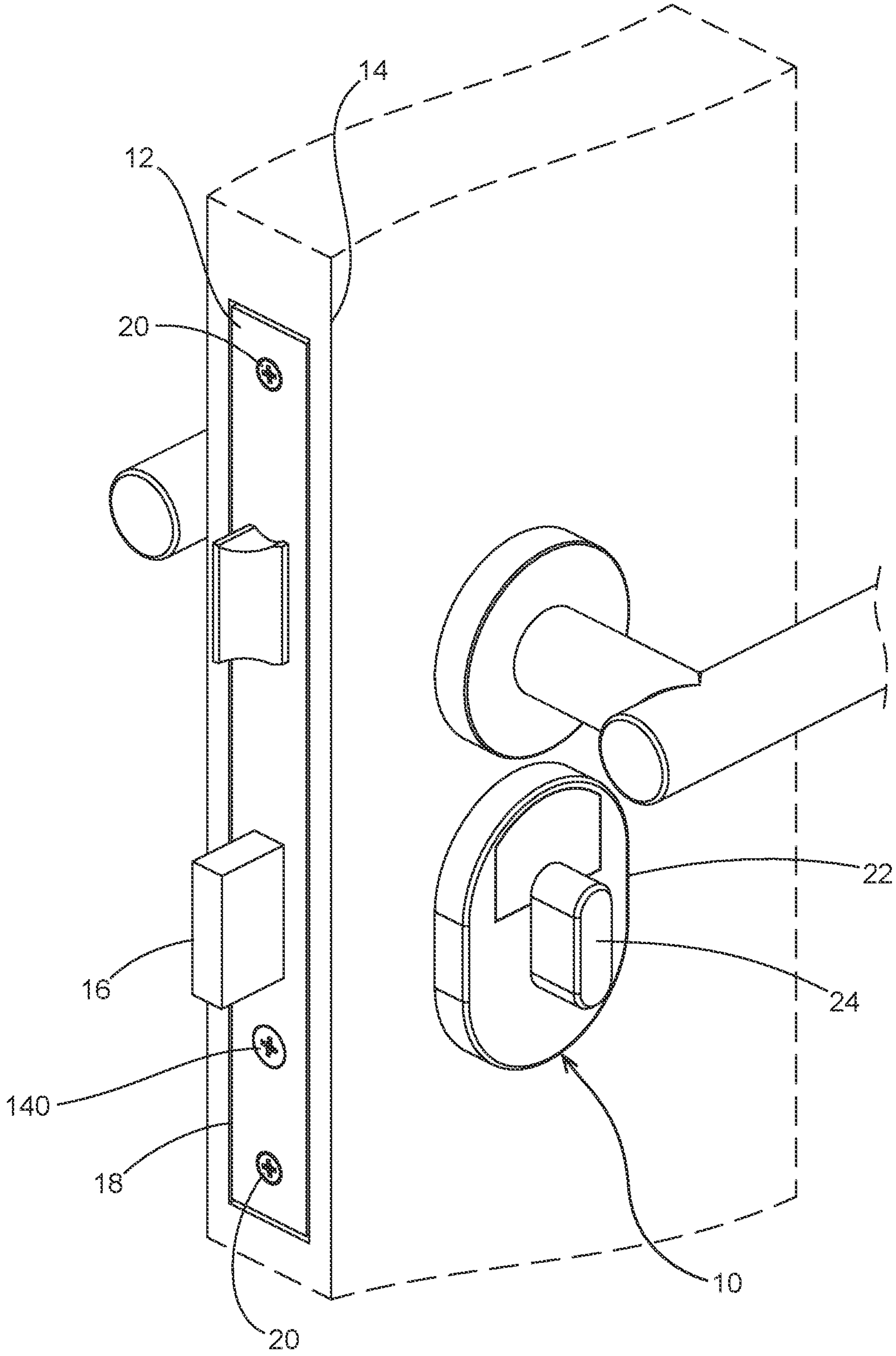
FIG. 1 is an exterior perspective view of an electronically operated lock cylinder assembly as mounted on a door.
Figure 2:
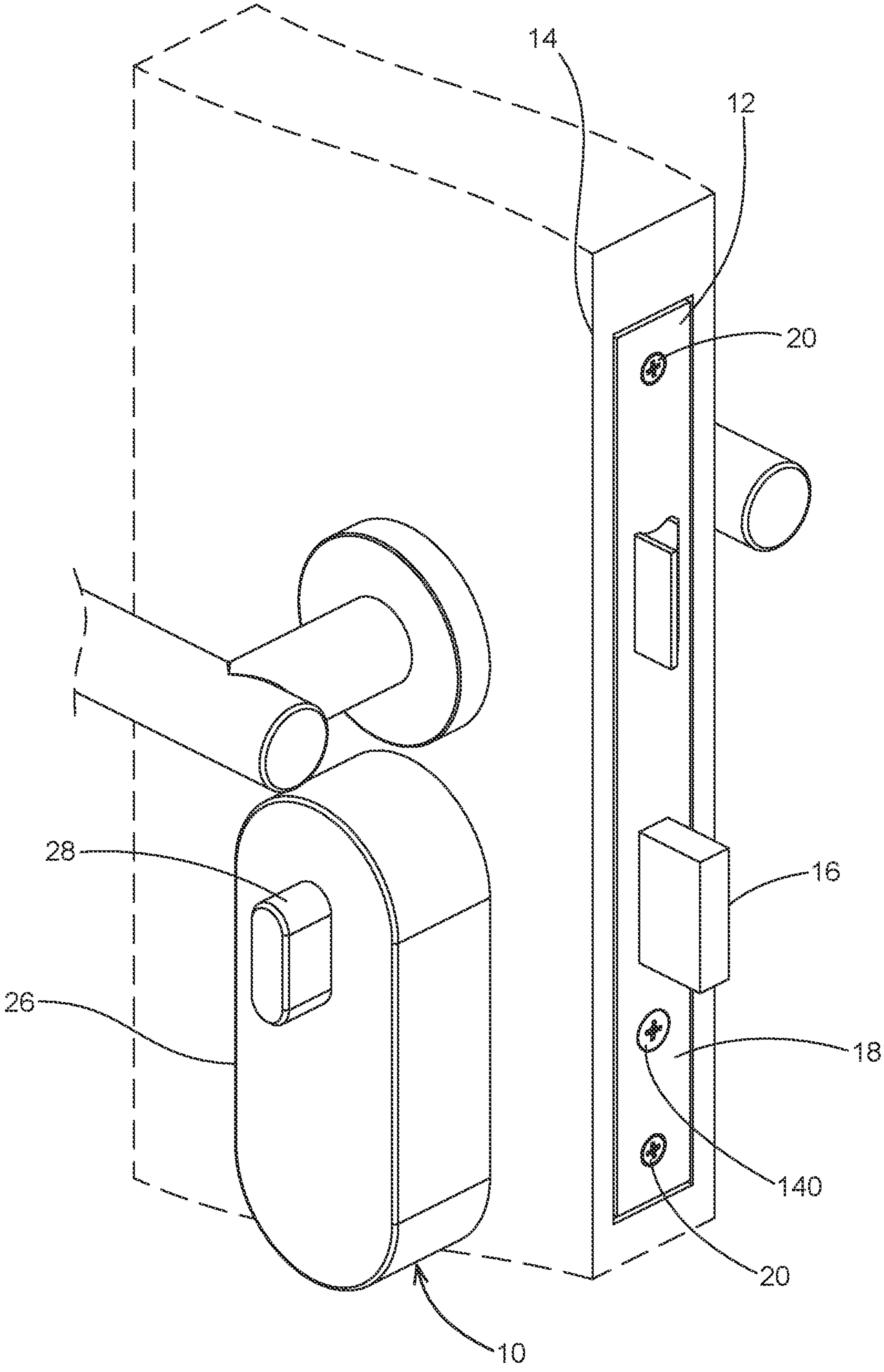
FIG. 2 is an interior perspective view of the lock cylinder assembly of FIG. 1.

Referring to FIGS. 1 and 2, an electronically operated European style lock cylinder assembly 10 useful in a mortise-type door lock is shown. The lock cylinder assembly 10 can replace an existing standard European-style deadbolt cylinder in a mortise lock to convert the lock from a manual key-operated lock to a lock that can be operated by an electronic credential including, without limitation, RFID, NFC, Bluetooth, BLE, keypad, or biometric. It can further be connected wirelessly to the internet or an intranet, either directly or indirectly via controllers, which act as an intermediate between the lock and the internet, including connecting to cloud-based servers. It can then be accessed remotely via, e.g., a personal computer, cell phone, or tablet.

The lock cylinder assembly 10 can be mounted to standard mortise lock housing 12 disposed in a door 14, the lock housing 12 including a bolt 16 and a faceplate 18. The lock housing 12 is secured to the door 14 in standard fashion via screws 20. The lock cylinder assembly 10 includes an access housing 22 having an access knob 24 disposed on an outside of the door 14, and a control housing 26 having a control knob 28 disposed on an inside of the door 14. As will be described in more detail below, the lock cylinder assembly 10 secures the door 14 in a closed position in known manner by extending the deadbolt 16 into a strike in the door jamb to secure a room or other space, and a user may provide a credential to the access housing 22 which will allow the user to rotate the access knob 24, retract the bolt 16 from the strike, which will allow the user to open the door 14 and enter into the space.

Figure 2A:
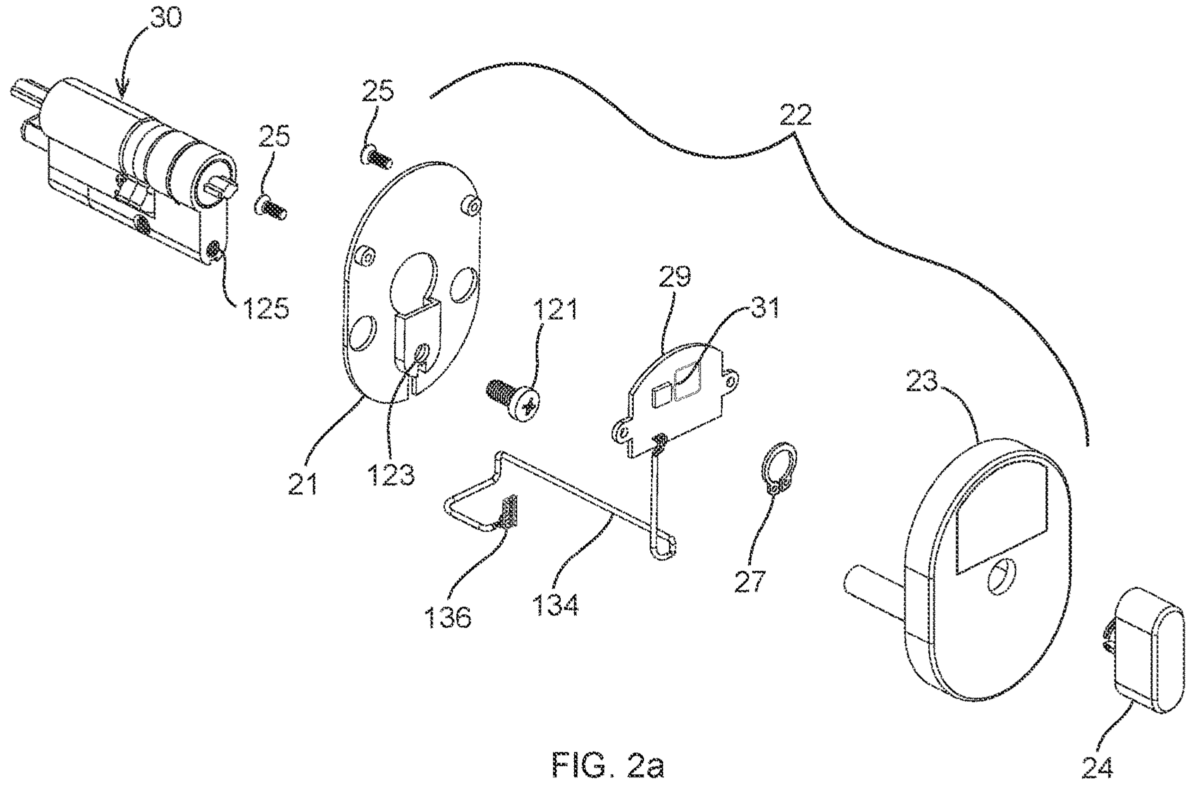
FIG. 2*a* is an exploded perspective view of an access housing and cylinder assembly of the lock cylinder assembly of FIG. 1.

Referring specifically to FIG. 2A, the access housing 22 includes a back panel 21 and a cover 23 fastened together by screws 25. The access knob 24 is rotatably maintained on the cover 23 by a clip 27. A circuit board 29 is disposed within the access housing 22, and it may contain one or more sensors 31 such as antennas for receiving one or more wireless signals, including without limitation Bluetooth, Bluetooth LE, NFC, and RFID. The wireless signals may comprise the credentials that authorize the user to open the lock. The access housing 22 may also include a keypad for entering a code, or may include any other known or yet to be developed structure or methods of entering an electronic credential, including fingerprint, facial scanning, retinal scanning, voice reader, other biometrics, and so forth. As will be described further, the lock 10 is constructed such that whether the lock is in a locked state or an unlocked state, a user within the space may rotate the control knob 28 on the control housing 26, and extend and retract the bolt 16. The circuit board 29 may also include a wireless internet antenna to allow the lock to be connected wirelessly to the internet for remote access control, usage data, audit trails, and the like.

Figure 3:
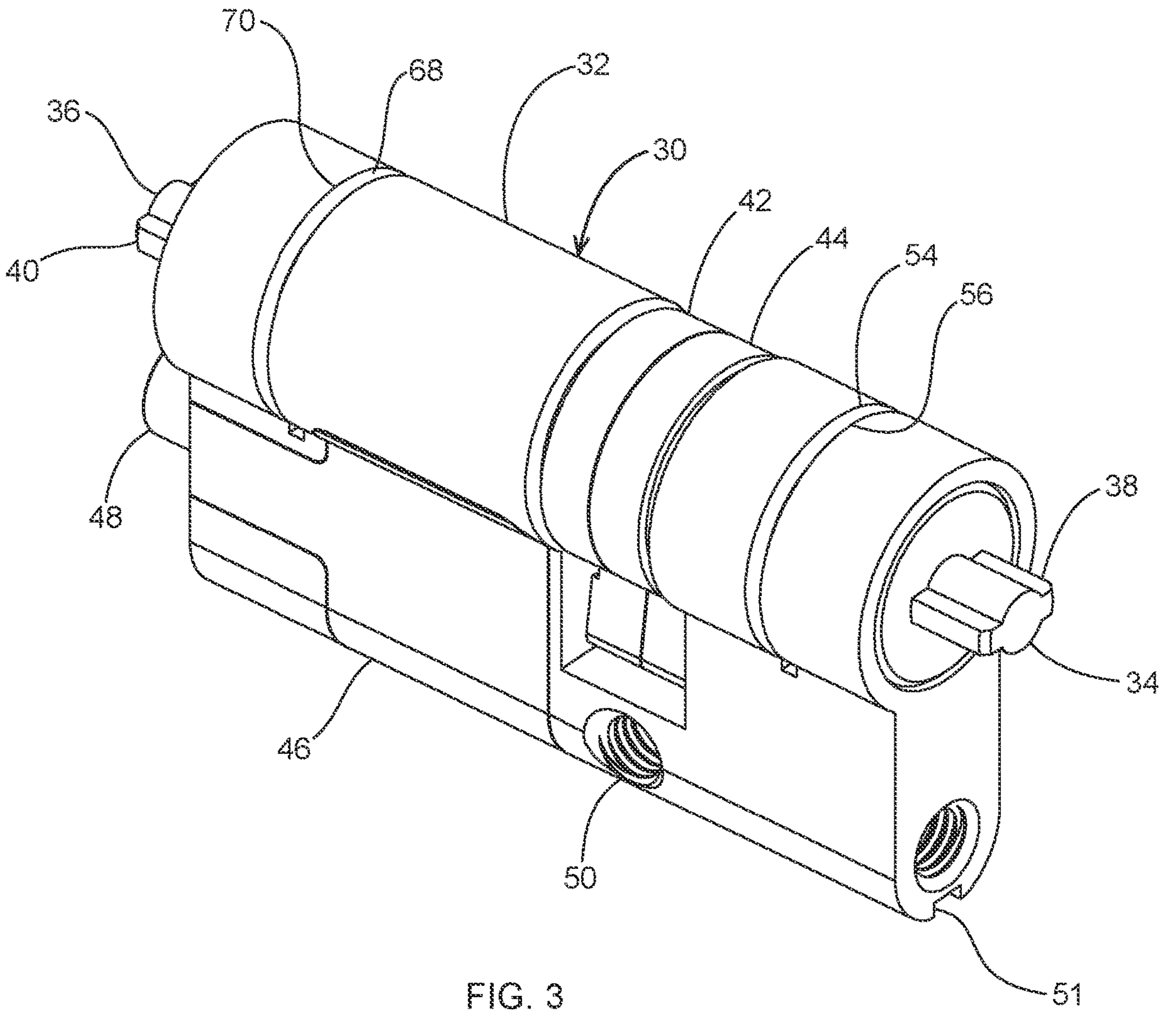
FIG. 3 is a detail perspective view of a cylinder assembly of the lock cylinder assembly of FIG. 1.
Figure 4:
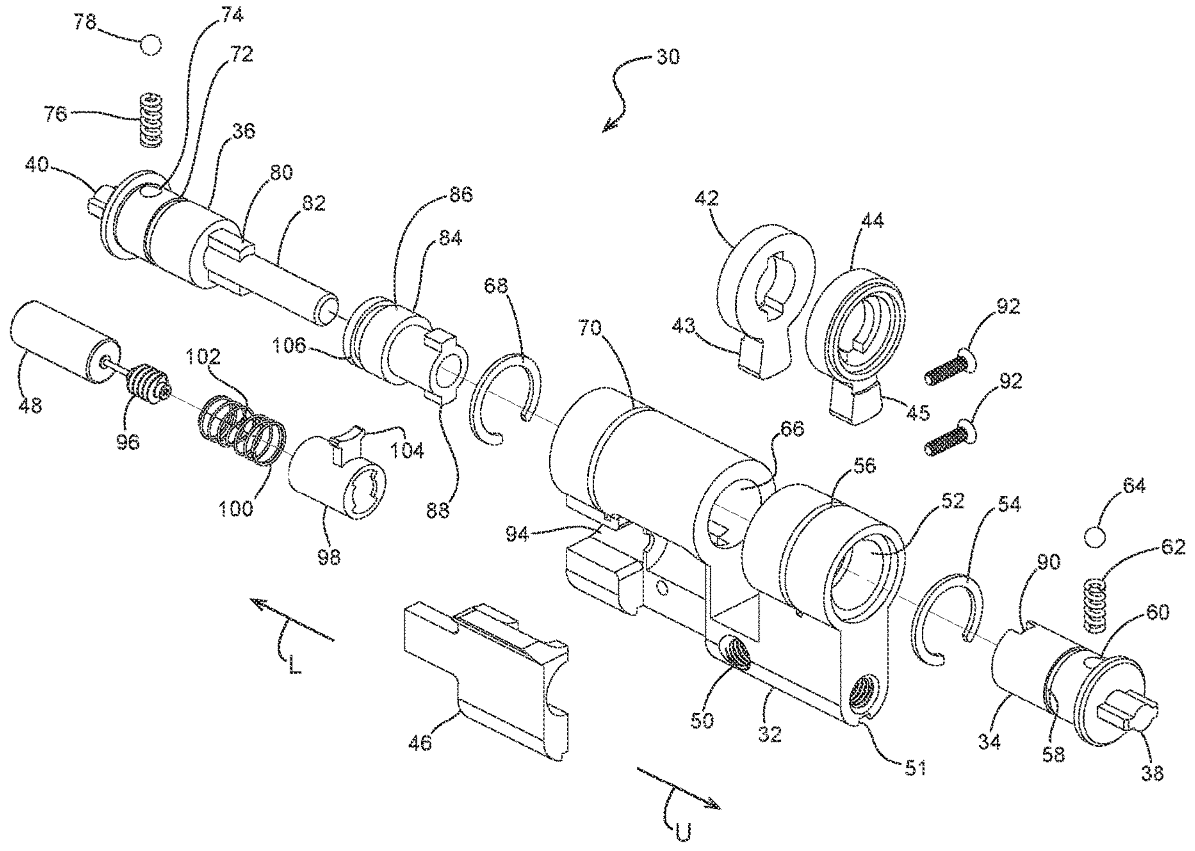
FIG. 4 is a perspective exploded view of the cylinder assembly of FIG. 3.

Referring now to FIGS. 3 and 4, an internal cylinder assembly 30 of the lock cylinder assembly 10 is depicted in an assembled state and an exploded state, respectively. The cylinder assembly 30 includes a lock core 32 rotatably housing an access shaft 34 and a control shaft 36. The access shaft 34 includes an access spline 38 and is mounted to the access knob 24 such that rotation of the access knob 24 is transmitted to the access shaft 34 via the access spline 38. Likewise, the control shaft 36 includes a control spline 40 and is mounted to the control knob 28. Rotation of the control knob 28 rotates the control shaft 36 via the control spline 40. The internal cylinder assembly 30 further includes a first cam 42 having a first lug 43 and a second cam 44 having a second lug 45 that operate to retract and extend the bolt 16 in known fashion. A motor cover 46 is mounted to the core 32 to allow installation of an electric motor 48 within the core 32. The core 32 includes a threaded mounting hole 50 used to mount the core to the mortise lock housing 12. The core 32 further includes a wiring channel 51 extending the length of the core to allow for control wiring to extend from the access housing 22 to the control housing 26. In this example the motor 48 is depicted as an electric motor, but those of ordinary skill will understand that other devices, such as gearmotors and electronic actuators, may work as well.

Referring specifically to FIG. 4, the access shaft 34 is disposed in an access channel 52 within the core 32. The access shaft 34 is maintained within the access channel 52 by a first clip 54 which sits in a first slot 56 in the core 32 and engages a circumferential recess 58 in the access shaft 34 to maintain the access shaft 34 axially but allow it to rotate. The access shaft 34 also includes a cylindrical recess 60 that accommodates a first spring 62 and a first ball 64. The first ball 64 can engage a detent on an inside surface of the access channel 52 to locate the access shaft 34 at a predetermined rotational orientation.

The control shaft 36 likewise is disposed in a control channel 66 within the core 32. Similarly, the control shaft 36 is maintained within the control channel 66 by a second clip 68 disposed within a second slot 70 in the core 32 that engages a circumferential recess 72 in the control shaft 36. The second clip 68 also maintains the control shaft 36 longitudinally but allows for rotation. The control shaft 36 also includes a cylindrical recess 74 that houses a second spring 76 and a second ball 78 which can engage a detent on an inner surface of the control channel 66 to maintain the control shaft 36 in a predetermined rotational orientation.

The control shaft 36 includes a second spline 80 and a control rod 82. Disposed on the control rod 82 is a clutch 84 having a hub 86 and a clutch spline 88. The hub 86 includes recesses (not seen in FIG. 4) that receive the second spline 80 such that rotation of the control shaft 36 causes rotation of the clutch 84. The clutch 84 is axially translatable along the control rod 82 such that clutch spline 88 selectively engages either (a) the first cam 42, or (b) the second cam 44 and hub recesses 90 of the access shaft 34, as will be discussed further below.

The motor cover 46 is detachably connected to the core 32 via two screws 92. The motor cover 46 and the core 32 define a seat 94 that houses the motor 48 and a worm gear 96 connected to the motor 48. A slider 98 is also disposed in the seat 94, the slider 98 having a spring 100 disposed therein. The spring 100 includes a narrowed portion 102 which is disposed on the worm gear 96 and engages the teeth of the worm gear 96 such that rotation of the worm gear 96 pushes the spring 100 in directions U and L, and therefore the slider 98, forward and backward. The slider 98 has a finger 104 extending upwardly into a circumferential recess 106 in the clutch 84.

Figure 5:
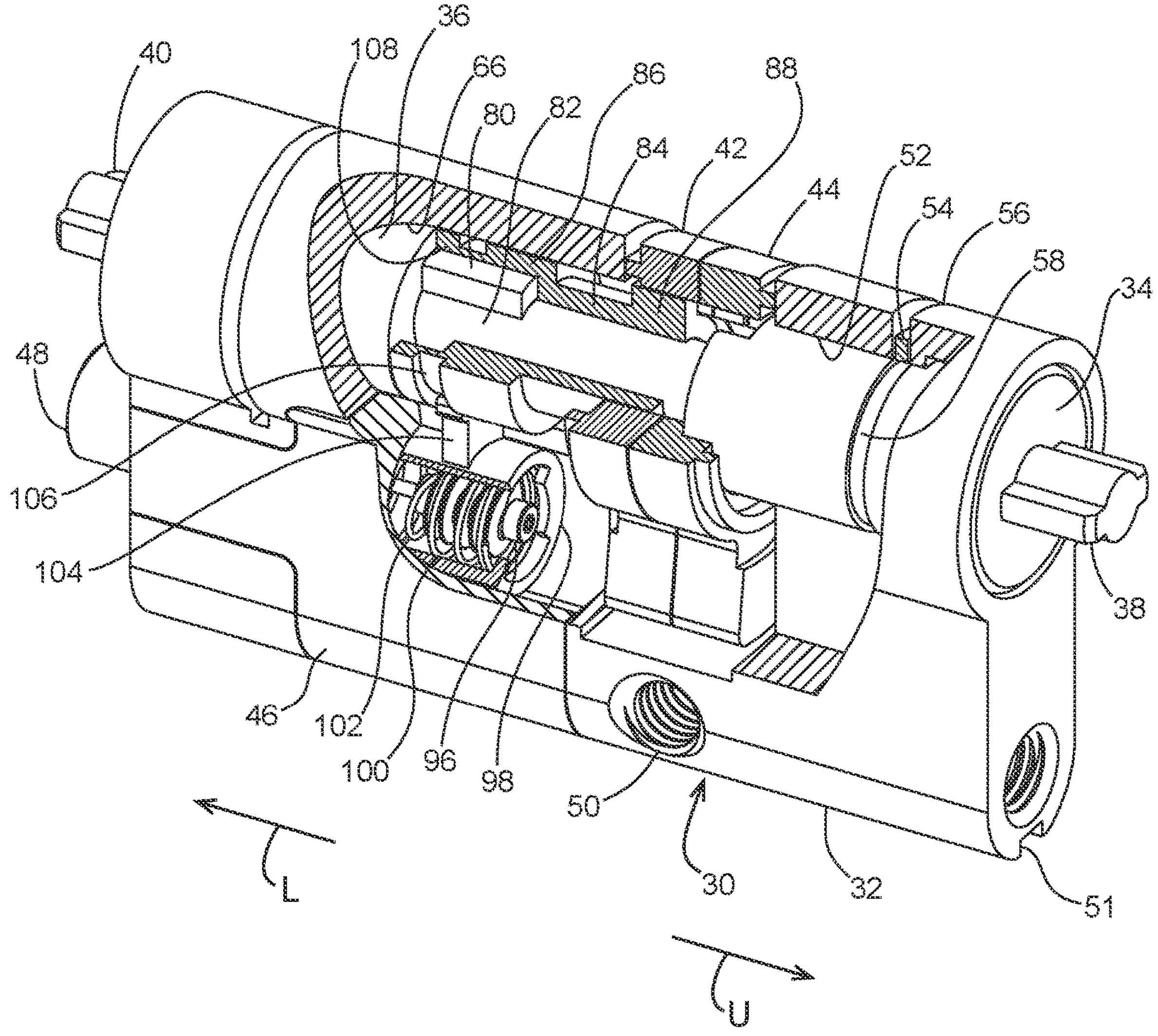
FIG. 5 is a perspective cut-away view of the cylinder assembly of FIG. 3 in the locked position.

Referring now to FIG. 5, the core 32 is shown in the locked position. In this position, the motor 48 has rotated the worm gear 96 and pulled the spring 100 in direction L. This action pulls the slider 98 and the clutch 84 in the same direction. The second spline 80 engages recesses 108 in the hub 86, and the clutch spline 88 engages recesses in the first cam 42. Accordingly, in this position, a user may rotate the control knob 28, which will rotate the first cam 42, which will operate to retract and extend the bolt 16 as is known. The clutch 84 is disconnected, however, from the second cam 44 and the access shaft 34. Thus, a user can freely rotate the access knob 24 and access shaft 34, and no action is made upon either the first cam 42 or the second cam 44, and therefore the position of the deadbolt 16 does not change.

Figure 6:
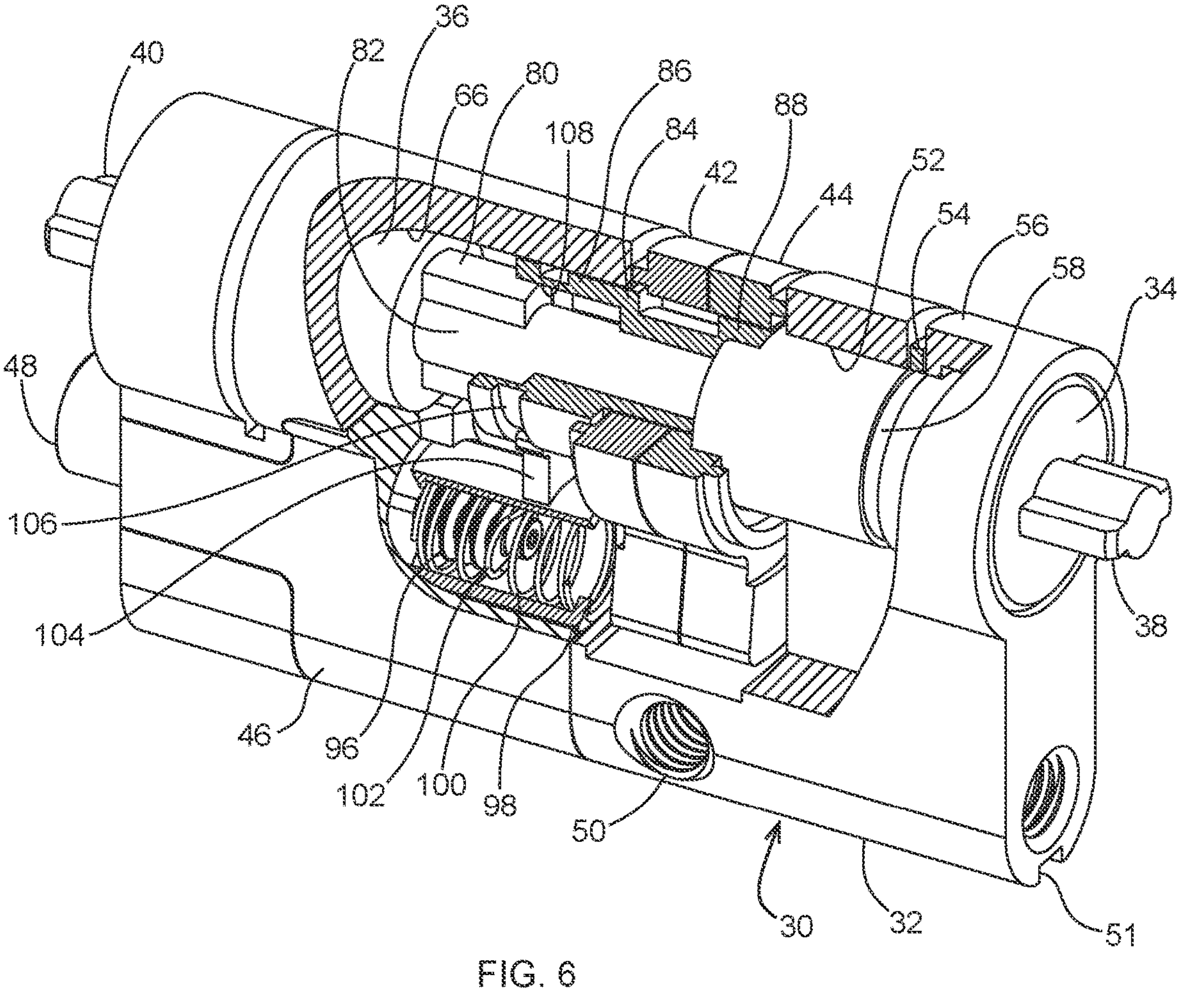
FIG. 6 is a perspective cut-away view of the cylinder assembly of FIG. 3 in the unlocked position.

Referring now to FIG. 6, the core 32 is shown in the unlocked position. The motor 48 has rotated the worm gear 96 and pushed the spring 100 in direction U. This action pushes the slider 98 and clutch 84 in the same direction. With the clutch 84 pushed in direction U, the clutch spline 88 engages the second cam 44, and, at the same time, the clutch spline 88 engages the block recesses 90 in the access shaft 34. In this position, a user rotating the access knob 24 will rotate the second cam 44, and extend or retract the bolt 16 as known. The second spline 80 of the control shaft 36 still engages the recesses 108 of the hub 86 of the clutch 84, and therefore rotation of the control knob 28 will rotate the control spline 40 and the second cam 44. Accordingly, in this position, rotation of both the access knob 24 and the control knob 28 will cause rotation of the second cam 44, moving the bolt 16 in and out as is known.

Referring now to FIGS. **2*a* and 7-18, installation of the lock cylinder assembly 10 is disclosed. The back panel 21 of the access housing 22 can be mounted to the cylinder assembly 30 by a screw 121 extending through a through hole 123 of the back panel 21 and into a threaded hole 125 of the lock assembly. The screws 25 then affix the back panel 21 to the cover 23 and also support the circuit board 29**. Typically this would be done by the manufacturer and not in the field.

Figure 7:
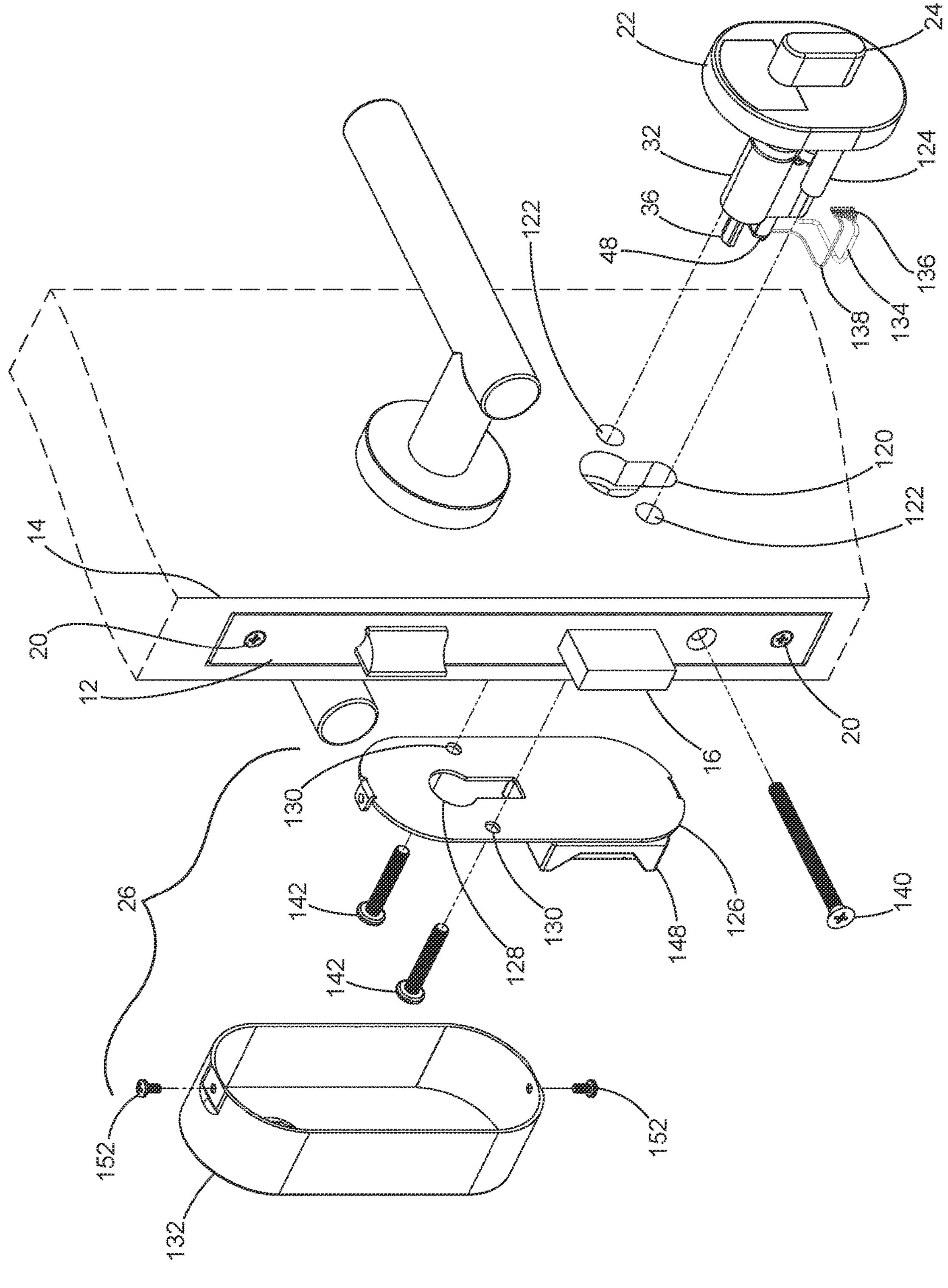
FIG. 7 is an exploded perspective view of the electronically operated lock cylinder assembly of FIG. 1 as mounted on a door.
Figure 8:
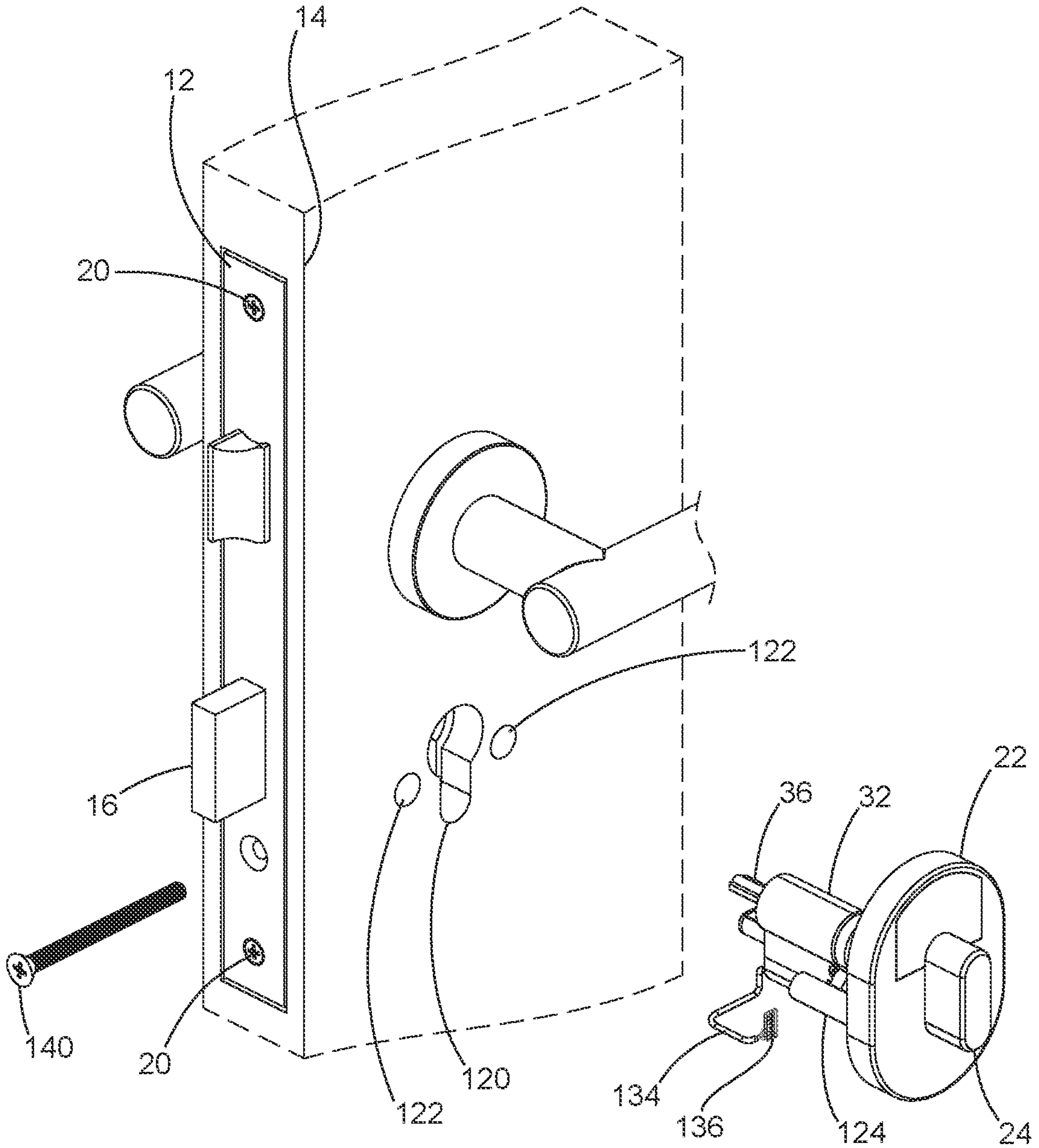
FIG. 8 is a perspective view of the access housing and the cylinder assembly of the lock cylinder assembly prior to insertion into the door.
Figure 9:
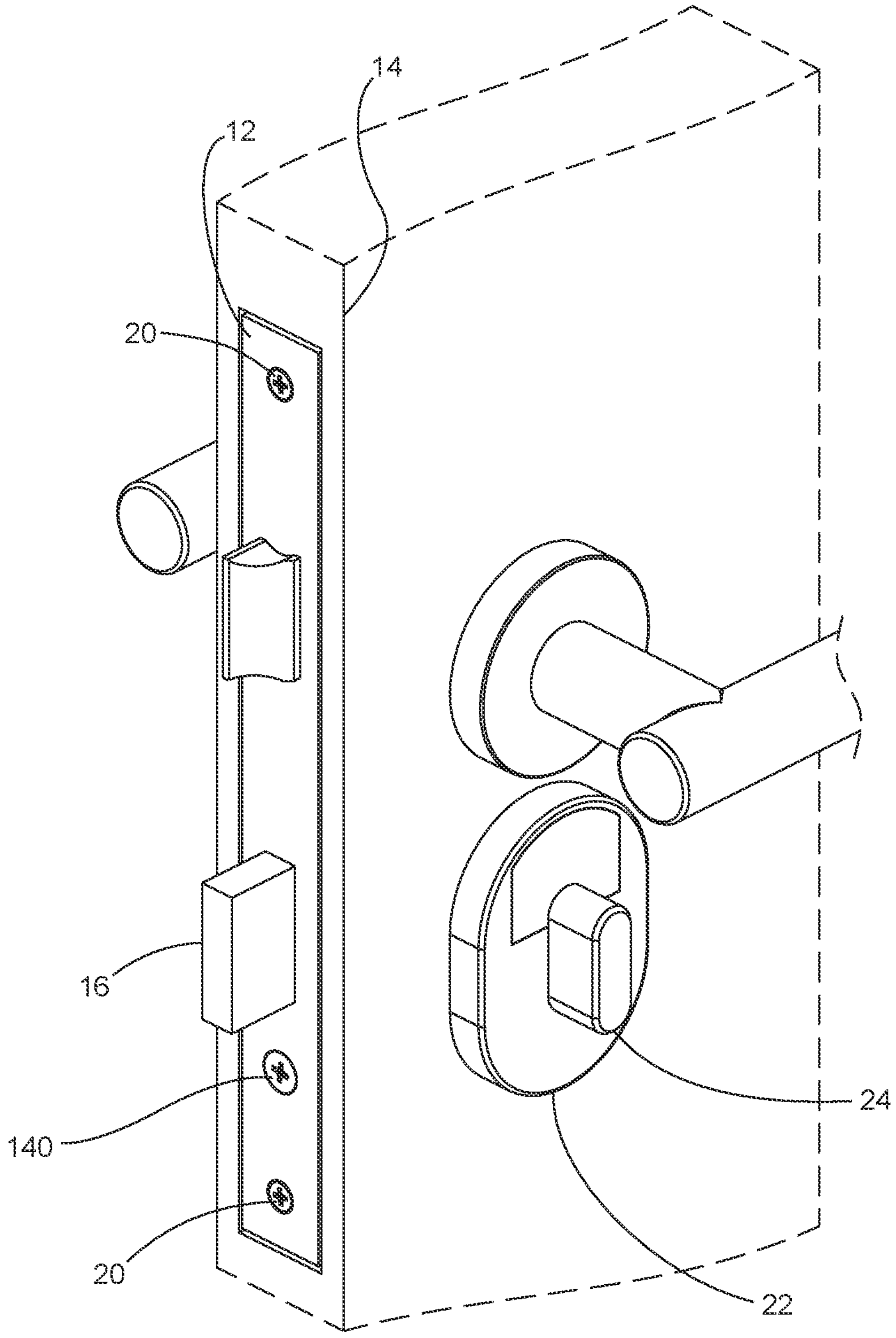
FIG. 9 is a perspective view of the access housing as mounted to the door.

Referring specifically to FIG. 7, the door 14 includes a core through hole 120 and a pair of fastener through holes 122. The access housing 22 includes a pair of internally threaded cylinders 124 extending laterally and generally in parallel with the core 32. The control housing 26 includes a mounting plate 126 having a keyway 128 for receiving the core 32 and through holes 130 coaxial with the threaded cylinders 124 of the access housing 22. The control housing 26 further includes a cover 132. First control wiring 134 extends from within the access housing 22 to a connector 136 and travels through the wiring channel 51, thereby connecting, at least in part, the sensor 31 in the access housing 22 to the connector 136. Accordingly, credentials captured by the sensor 31 in the access housing 22 can be transmitted to the connector 136. Second control wiring 138 extends from the motor 48 to the connector 136.

As shown in FIGS. 7-10, the core 32 is mounted to the access housing 22 and the access knob 24 as described above. The core 32 is disposed within the door 14 in the core through hole 120, and the internally threaded cylinders 124 are disposed within the fastening through holes 122. A core mounting screw 140 is then inserted through the faceplate 18 and into the core threaded mounting hole 50 to fix the core 32 within the door 14.

Figure 10:
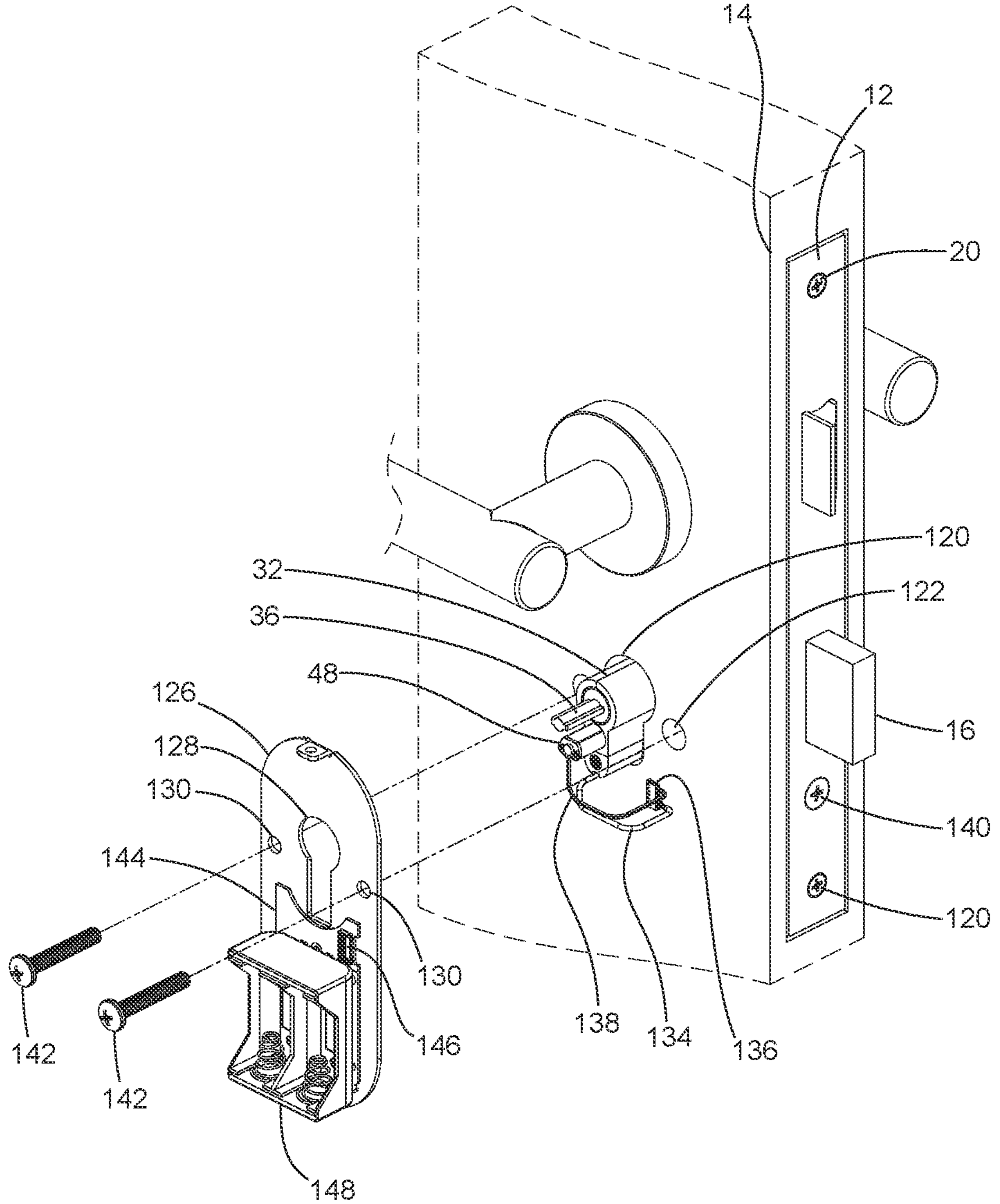
FIG. 10 is a perspective view of a mounting plate of a control housing of the lock cylinder assembly prior to mounting to the door.
Figure 11:
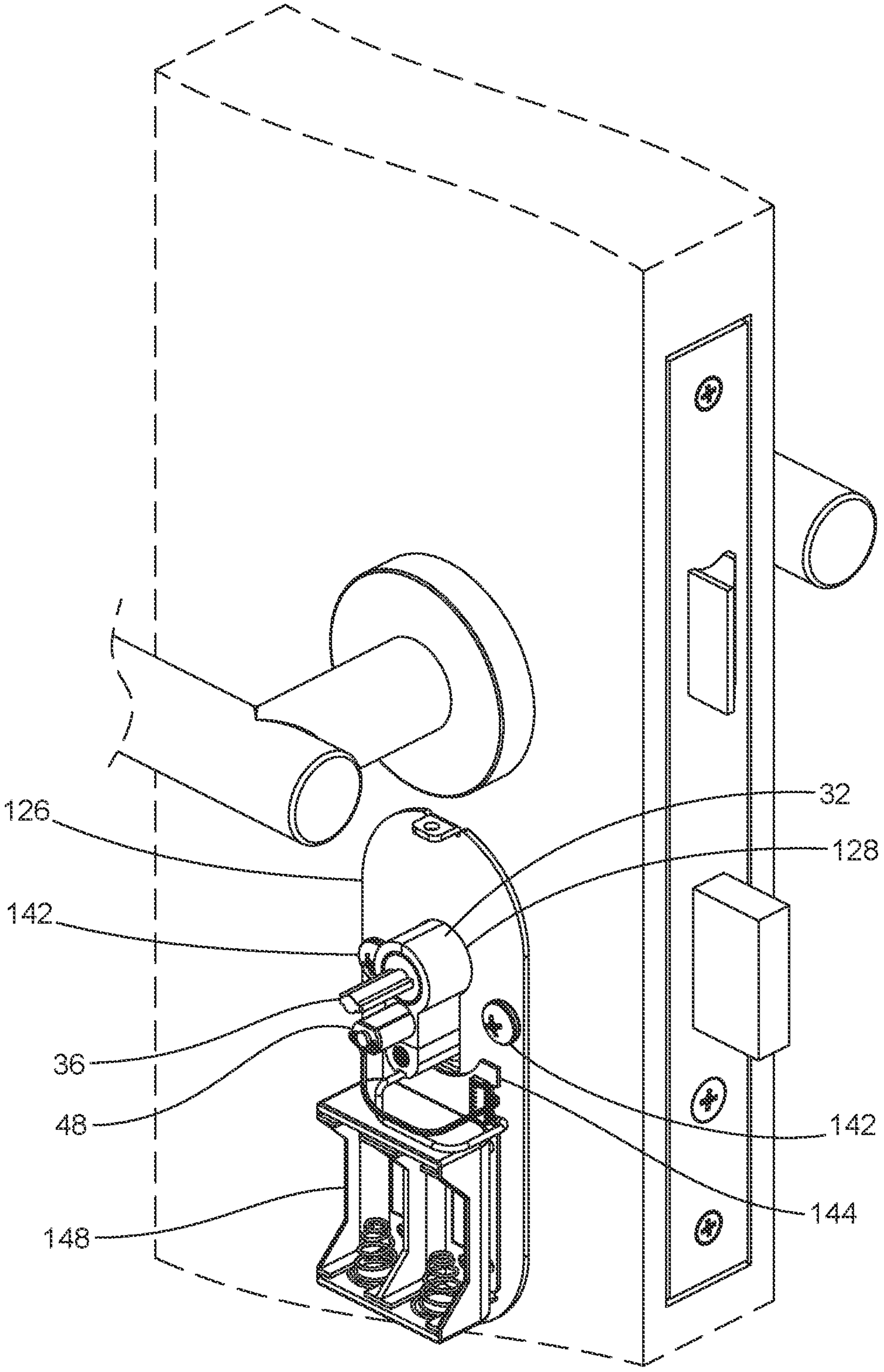
FIG. 11 is a perspective view of the mounting plate as mounted to the door.
Figure 12:
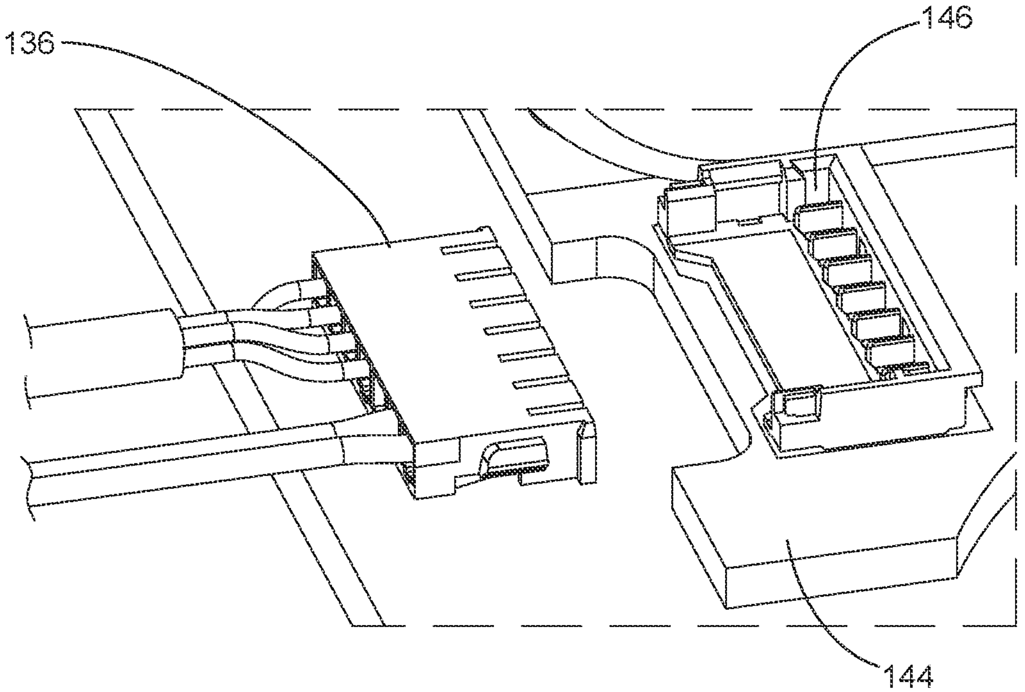
FIGS. 12 and 13 are detailed perspective views of the assembly of a connector to a receiver.
Figure 13:
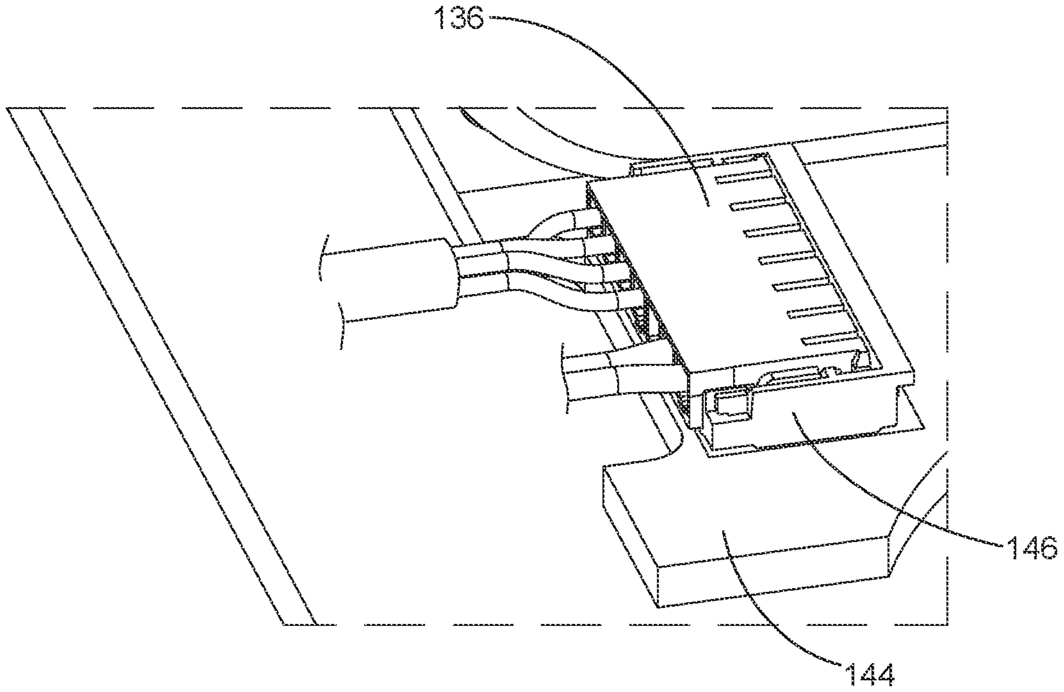

Referring now to FIGS. 10 and 11, the mounting plate 126 is affixed to the access housing 22 by inserting fasteners 142 through the through holes 130 and into the internally threaded cylinders 124, thereby clamping to the access housing 22 and the mounting plate 126 to the door 16. Disposed on the mounting plate is a circuit board 144. The circuit board 144 may include one or more of a processor, memory, and/or other components useful for receiving the credential, analyzing the credential, and providing instructions to power the motor 48. A receiver 146 is disposed on the circuit board 144 configured to receive the connector 136 that can connect the processor with the motor 48 and sensors 31. See FIGS. 12 and 13.

Figure 14:
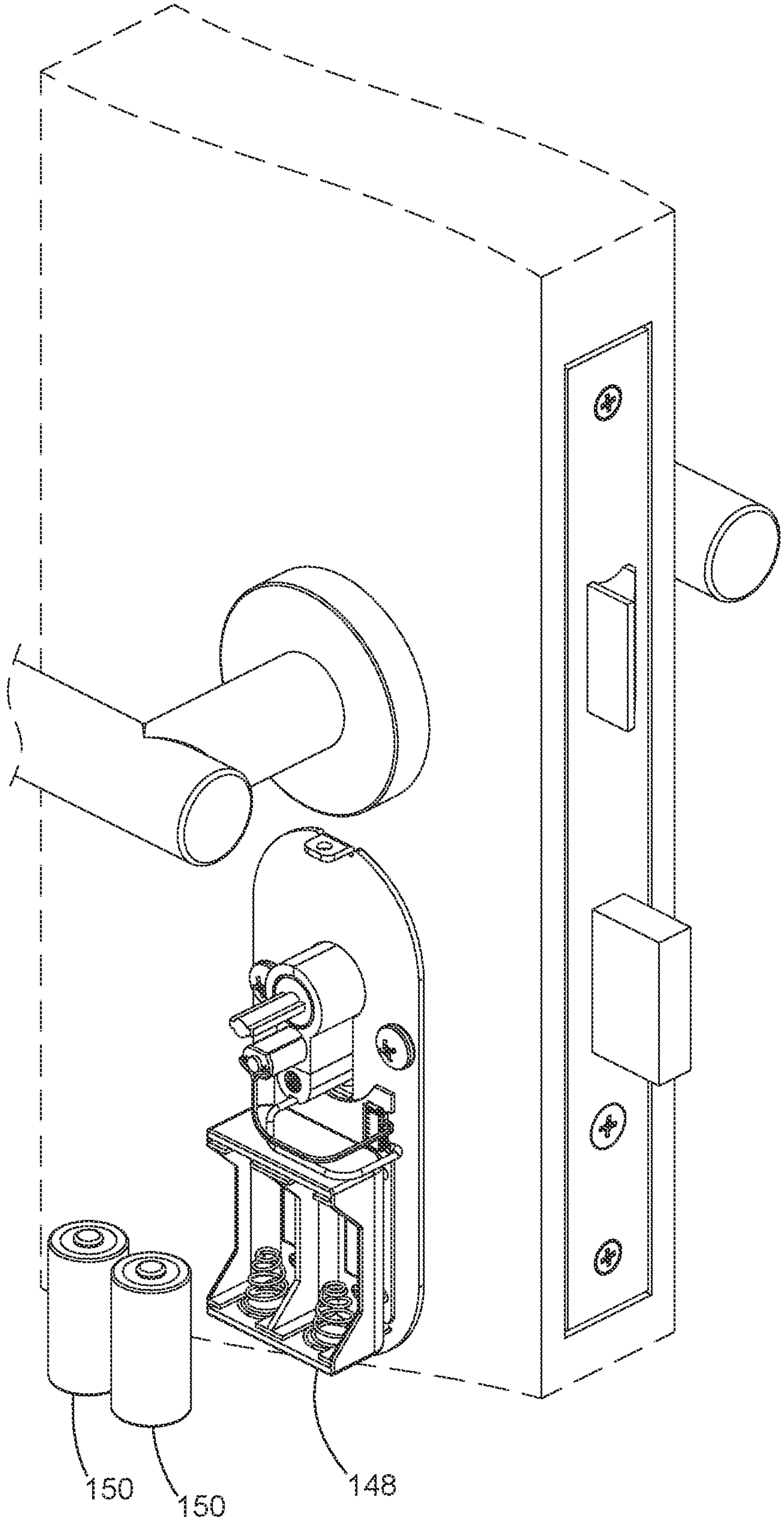
FIGS. 14 and 15 are perspective views of the assembly of the batteries to the mounting plate.
Figure 15:
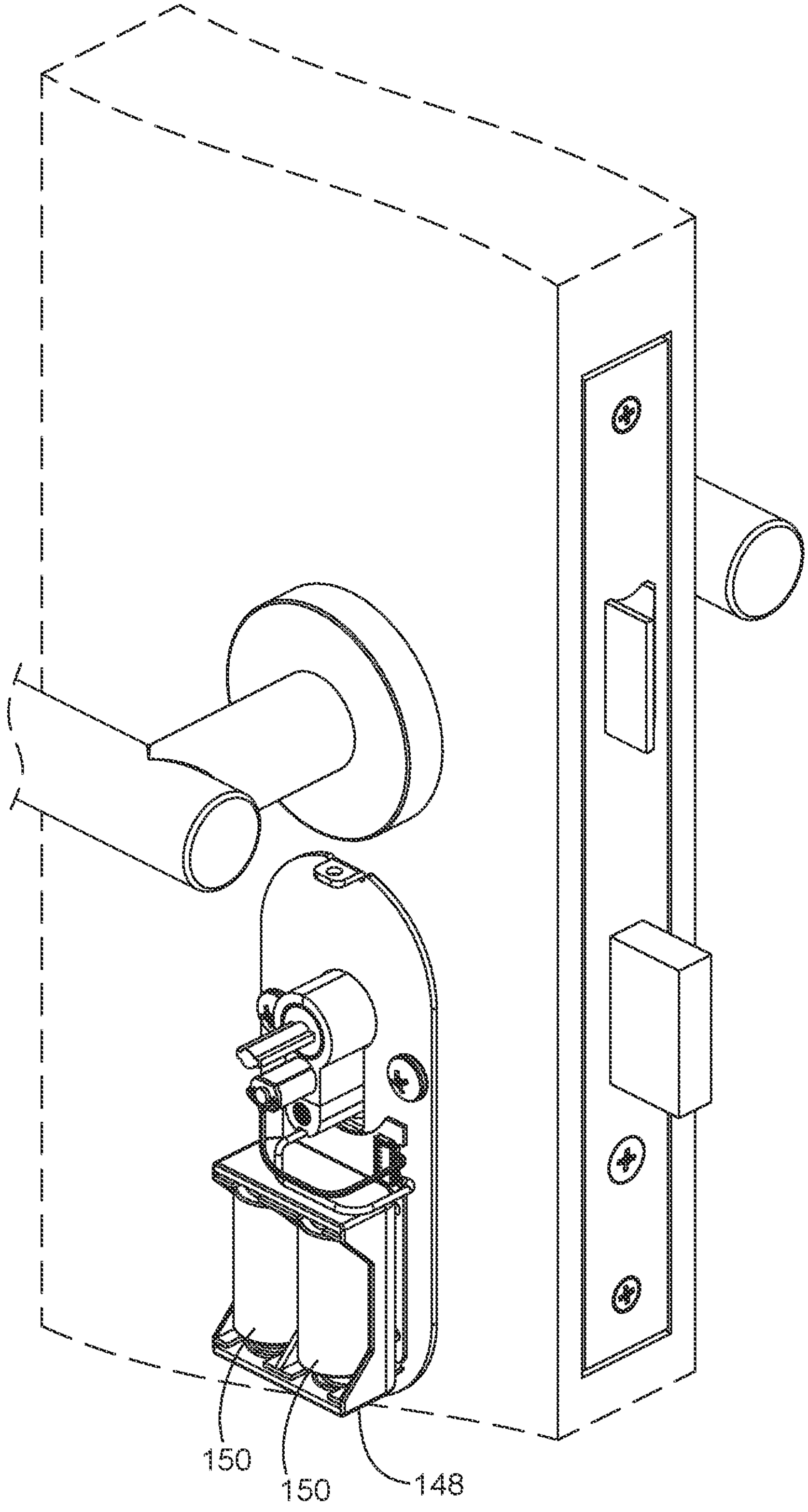
Figure 16:
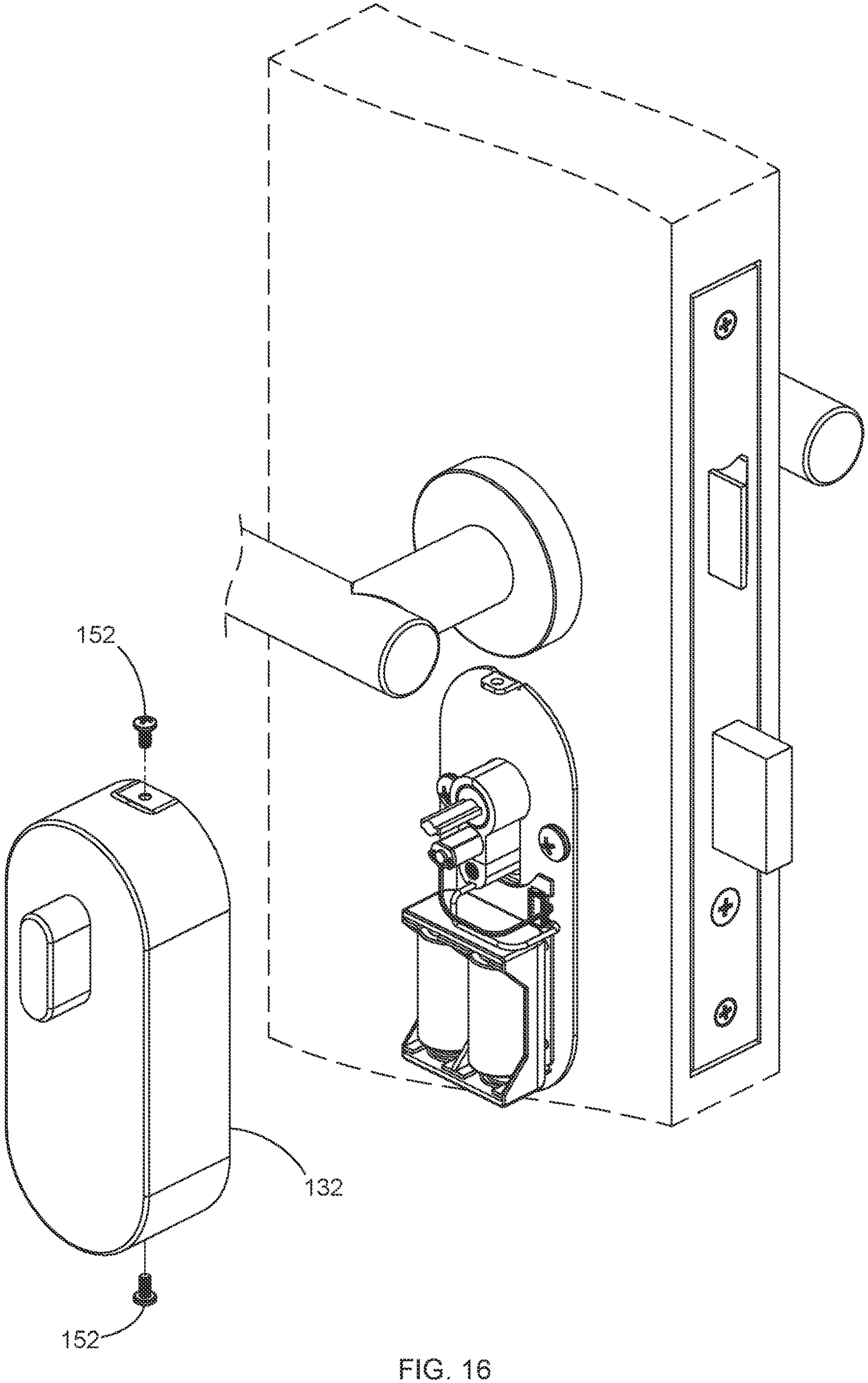
FIGS. 16 and 17 are perspective views of the assembly of a cover of the control housing to the mounting plate.
Figure 17:
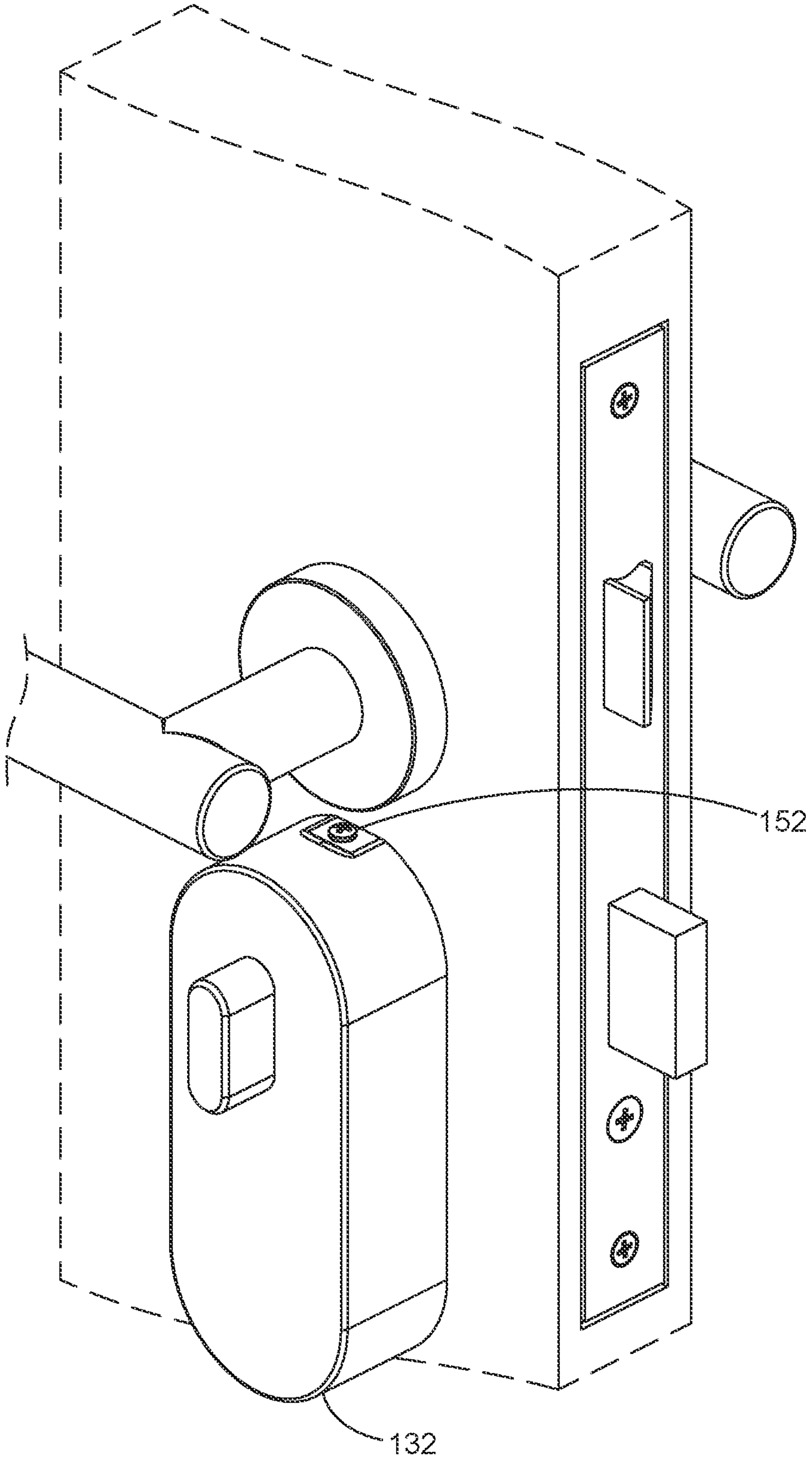

Also in connection with the circuit board 144 is a battery pack 148 for powering the lock 10. As shown in FIGS. 14 and 15, batteries 150 may be installed in the battery pack 148. As shown in FIGS. 16 and 17, the cover 132 can then be mounted to the mounting plate 126 via fasteners 152. Other means of fastening can be employed, such as latches and snaps.

In use, a user provides an electronic credential to the access housing 22. The sensor 31 disposed within the access housing 22 reads the credential and passes it on to the connector 136 via wiring 134. The processor on the circuit board 144 then receives the credential and determines if it meets predetermined conditions. If so, it sends a signal to the motor 48, which then rotates the worm gear 96, thereby either pulling or pushing the clutch 84 in direction U or L. The spring 100 allows for misalignment of the clutch spline 88 and the hub recesses 90 of the access shaft 34. Thus, if the clutch spline 88 is not aligned with the hub recesses 90 of the access shaft when the clutch 84 is pushed in direction U, the user can rotate the access shaft 34 until they are aligned, and he or she will feel the spring 100 push the spline 88 into the hub recesses 90 once the two are aligned. At this point, the user can then rotate the access knob 24 and operate the lock 10. Other applications of the lock cylinder assembly 10 described herein will be within the scope and spirit of this disclosure.

We claim:

1. An assembly for an electronically operated lock cylinder, comprising:

a core having a proximal side and a distal side and a proximal cam, the proximal cam configured to operatively couple to a deadbolt;

an access housing operatively coupled to the core on the proximal side and including an access knob and an input for receiving an electronic credential;

a control housing operatively coupled to the core on the distal side and including a control knob and at least one battery receptacle;

an actuator;

the core including a channel and wiring disposed in the channel, the wiring configured at least in part to transmit power from the battery receptacle to the access housing;

wherein, upon receipt of a predetermined credential by the input, the actuator configured to operatively couple the access knob to the proximal cam.

2. The assembly of claim 1, the input is one or more wireless antennas.

3. The assembly of claim 2, wherein the one or more wireless antennas includes at least one of an RFID, Bluetooth, BLE, NFC, or Mobile ID antenna.

4. The assembly of claim 1, the input including a biometric sensor.

5. The assembly of claim 1, the input including a keypad.

6. The assembly of claim 1, further comprising an antenna configured to operatively couple the assembly to the internet.

7. The assembly of claim 1, further comprising at least one battery disposed in the battery receptacle.

8. The assembly of claim 1, the core including a first shaft coupled to the control knob and a second shaft coupled to the access knob, wherein upon receipt of a predetermined credential by the input, the actuator configured to operatively couple the first shaft to the second shaft.

9. The assembly of claim 8, a clutch disposed on the first shaft and shiftable from a first position to a second position, wherein in the second position the clutch operatively couples the first shaft to the second shaft.

10. The assembly of claim 9, further comprising a distal cam, the clutch further including a clutch spline, wherein when the clutch in in the first position, the clutch is operatively coupled to the distal cam, wherein when the clutch is in the second position, the clutch is operatively coupled to the proximal cam.

11. The assembly of claim 10, further comprising a slider operatively connected to the actuator, the slider being operatively coupled to the clutch.

12. The assembly of claim 11, the slider including a finger, the finger being disposed within a recess in the clutch.

13. The assembly of claim 1, the actuator comprising an electric motor.

* * * * *